(No Model.)

A. LOOMIS.
PISTON VALVE.

No. 410,906. Patented Sept. 10, 1889.

Witnesses:
Edm. P. Ellis,
L. L. Burket

Inventor:
Alvah Loomis,
per F. A. Lehmann,
Atty

UNITED STATES PATENT OFFICE.

ALVAH LOOMIS, OF ST. ALBANS, VERMONT, ASSIGNOR OF ONE-HALF TO JOHN W. BROUGH, OF SAME PLACE.

PISTON-VALVE.

SPECIFICATION forming part of Letters Patent No. 410,906, dated September 10, 1889.

Application filed November 23, 1888. Serial No. 291,630. (No model.)

*To all whom it may concern:*

Be it known that I, ALVAH LOOMIS, a citizen of the United States, residing at St. Albans, in the county of Franklin and State of Vermont, have invented certain new and useful Improvements in Packing for Shield Balance Valves or Cylinders, of which the following is a specification, reference being had therein to the accompanying drawings.

My invention relates to an improvement in piston-valves; and it consists in the combination of a number of packing-sections which are made of substantially Z shape and a corresponding number of sections which are made L-shaped, and which sections are applied to a valve or piston rod, and springs which are placed inside of the packing-sections, so as to force them outward and make tight joints, all of which will be more fully described hereinafter.

The object of my invention is to provide packing rings or sections which form tight joints with the interior of the cylinder or tube, and which sections are so shaped at their inner edges as to overlap each other, and thus form a perfect packing.

Figure 1:
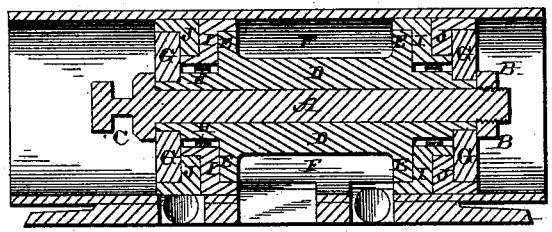
Figure 2:
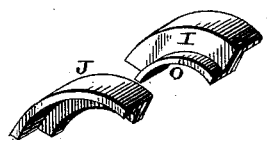
Figure 3:
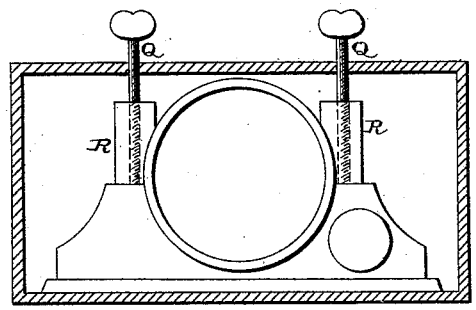

Figure 1 represents a longitudinal vertical section of a valve to which my packing is applied. Fig. 2 is a perspective of two portions of the packing detached. Fig. 3 shows one method of applying the valve-cage to the steam-chest.

A represents the rod, which is made screw-threaded at one end, so as to receive the clamping-nut B, and which is provided with the head C at its opposite end. This rod passes through the tubular body D, which is provided with the two flanges E, which project outward sufficiently far to leave a steam-space F between them. The ends of the body are reduced so as to allow the disks G to be placed upon them and held in position by the clamping rod and nut. Between the disks G and the flanges E is left a sufficient space to receive the packing-sections I J and the springs H, which are placed inside of the sections for the purpose of forcing them outward against the cylinder in which the valve or piston is placed. In cylindrical valves a packing-section may be placed at each end, as here shown; but in a piston a single packing-section will be sufficient. The sections I are made of substantially Z shape, as shown, and the outer flange rests upon the top of the disk G or flange E, while the inner flange O extends horizontally across the space between the disk and the flange. The other section J of the packing is made L shape and rests upon the disk or the flange, while its vertical portion extends into the space between the flange and the disk makes a tight connection with the flanges O upon the other section I. The joints between the sections I J are broken, so that no spaces are left between them through which the steam, compressed air, or gas can pass, and as the sections make tight joints with each other at every point no possible leakage between them can occur. The springs placed inside of the sections serve to force them outward, so as to make a tight joint with the interior of the cylinder and automatically take up any wear which may take place. By tightening the nut upon the end of the screw-rod the disk can be made to clamp the packing-sections together with any desired degree of force.

In shield balance-valves, the sections being whole over the port-holes, they readily ride the bridge without the possibility of dropping in.

To prevent the possibility of the interior sections of the disks from turning or revolving in balance-valves, I project a pin from the stem back of the port which is designed to enter the opening between corresponding and adjoining ends of the sections of the disks, thus preventing the liability of the steam working through the joints between the packing-sections, which form the entire lapping on the valve both inside and outside. By forming one of the sections with a flange to fit over the edge of the disk or flange and another flange to extend across the space between the flange and the disk and making the other sections L-shaped the sections are made to overlap in such a manner as to form an absolutely tight joint.

When the relief-valve is used in a cage, the cage is securely braced and held against the bottom of the steam-chest by means of the screws Q, which pass through the bosses R. The cage may be secured to the cylinder in any other way that may be preferred.

Having thus described my invention, I claim—

The combination of the rod, the tubular body applied thereto and provided with the flanges E, the disks placed upon the ends of the body, the packing-rings, shaped as shown, and the springs for forcing the rings outward, substantially as shown.

In testimony whereof I affix my signature in presence of two witnesses.

ALVAH LOOMIS.

Witnesses:
CHARLES E. ALLEN,
GILBERT A. DOW.